(12) United States Patent
Gordon et al.

(10) Patent No.: US 6,216,857 B1
(45) Date of Patent: Apr. 17, 2001

(54) PACKAGING DEVICE FOR DISC-SHAPED ITEMS AND RELATED MATERIALS AND METHOD FOR PACKAGING SUCH DISKS AND MATERIAL

(76) Inventors: Alexandra Gordon, 115 The Farms Rd., Bedford, NY (US) 10506; Charles W. Grimes, 55 Allwood Rd., Darien, CT (US) 06820

( * ) Notice: Subject to any disclaimer, the term of this patent is extended or adjusted under 35 U.S.C. 154(b) by 0 days.

(21) Appl. No.: 09/161,064

(22) Filed: Sep. 25, 1998

(51) Int. Cl.[7] .................................................. B65D 85/57
(52) U.S. Cl. ................... 206/232; 206/308.1; 206/310; 446/73; 53/471
(58) Field of Search .................................. 206/232, 307, 206/308.1, 308.3, 309, 310; 220/212, 522; 53/471; 215/227; 446/73

(56) References Cited

U.S. PATENT DOCUMENTS

| | | | | |
|---|---|---|---|---|
| 1,464,827 | * | 8/1923 | Morrison | 206/309 |
| 1,940,088 | * | 12/1933 | Harrison | 206/309 |
| 2,020,381 | * | 11/1935 | Labowitz et al. | 206/309 |
| 4,535,888 | * | 8/1985 | Nusselder | 206/308.1 |
| 5,284,243 | * | 2/1994 | Gelardi et al. | 206/308.1 |
| 5,542,531 | * | 8/1996 | Yeung | 206/308.1 |
| 5,697,498 | * | 12/1997 | Weisburn et al. | 206/308.1 |
| 5,816,394 | * | 10/1998 | O'Brien et al. | 206/308.1 |
| 5,819,929 | * | 10/1998 | Chung | 206/308.1 |

* cited by examiner

*Primary Examiner*—Jim Foster
(74) *Attorney, Agent, or Firm*—Grimes & Battersby, LLP

(57) ABSTRACT

An elongated packaging device is provided for packaging at least one disc-shaped item such as, for example, a recording media disc such as a CD, a CD-ROM or a DVD, together with other materials relating to such disc or otherwise in a stacked relationship. The packaging device includes an opening at one end thereof, and it has at least one internal upper chamber and at least one internal lower chamber for respectively receiving the disc-shaped item and the other materials. These chambers are divided by a support element that is adapted to positively retain the disc-shaped item within the upper chamber. A lid is further provided for closing the opening at the end of the packaging device. A method is further provided for packaging such disc-shaped item and other material within the packaging device.

29 Claims, 11 Drawing Sheets

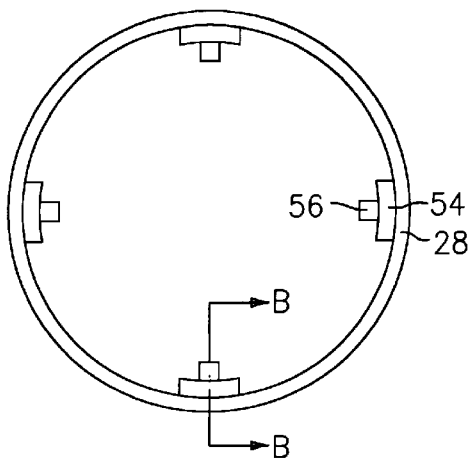
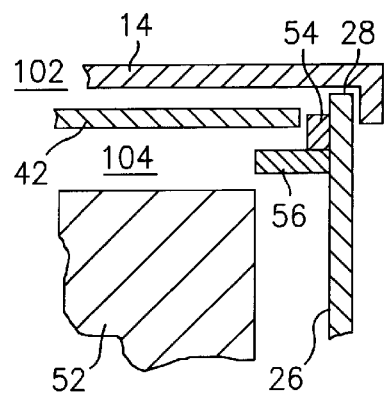
FIG. 3   FIG. 3A
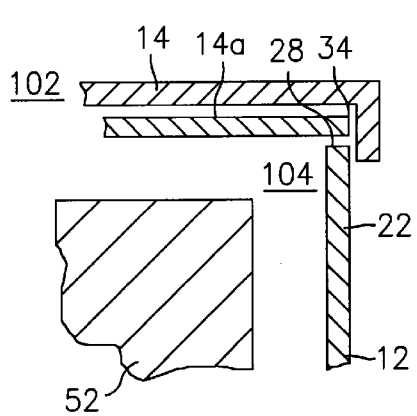
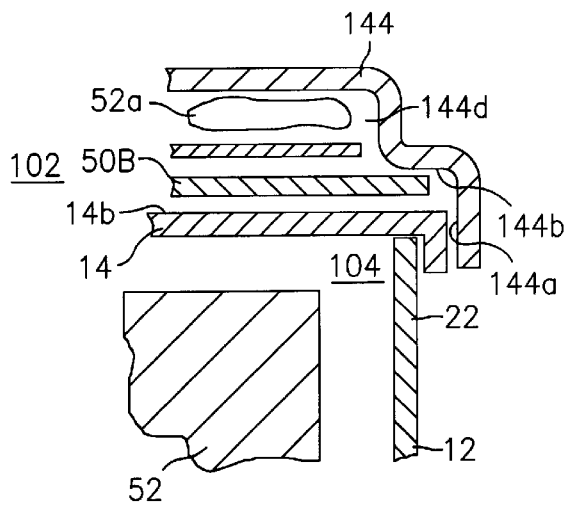
FIG. 3B   FIG. 3C

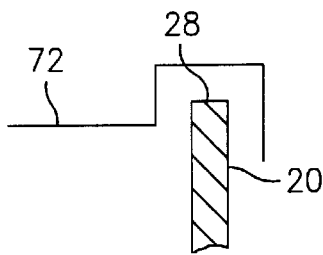
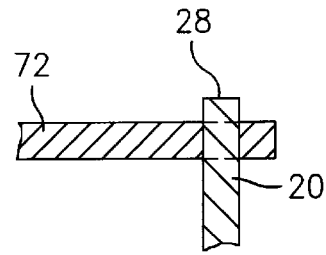
FIG. 6A
FIG. 6B
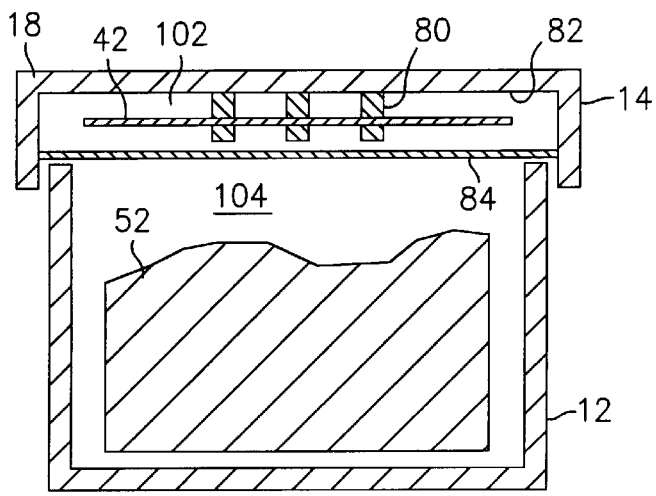
FIG. 7
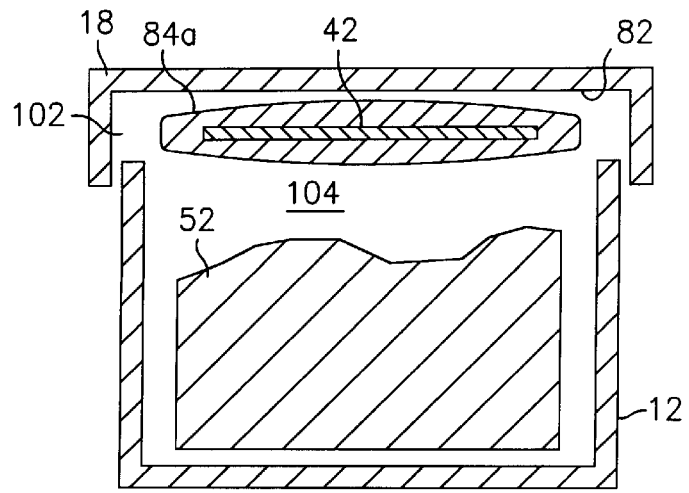
FIG. 7A

PACKAGING DEVICE FOR DISC-SHAPED ITEMS AND RELATED MATERIALS AND METHOD FOR PACKAGING SUCH DISKS AND MATERIAL

FIELD OF THE INVENTION

This invention relates, in general, to a device for packaging and displaying a circular or disc-shaped media and other materials and a method for packaging such disc-shaped media and other materials and, in particular to containers and methods for initially packaging and thereafter repeatedly storing disc-shaped media together with or without other materials.

Still more particularly, the present invention relates to a new and improved container for initially packaging and thereafter repeated storing of disc-shaped media and other materials in stacked relationship, having a first chamber and a second chamber stacked on top of one another for respectively receiving and securely retaining the disc media and the other materials.

Still more particularly, the present invention further relates to a new and improved method for initially packaging and thereafter repeated storing of media and other materials in stacked relationship, wherein in a preferred embodiment the other materials are placed inside an open ended container, a support element is inserted into the container through the open end, media is inserted into the container through the open end and placed in seating engagement with the support element and a lid is applied to the open end of the container.

BACKGROUND OF THE INVENTION

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure repeated re-storage of the disc media and ancillary materials. They are often damaged during initial opening and repeated re-storage. They are often unable after initial opening to securely re-store the disc media (in the jewel box) and the other materials together in the cardboard packaging in a manner to preclude contact with each other. They frequently become unsightly after initial opening and repeated re-storage. They are, themselves, difficult to handle and store.

Other types of packaging and storage devices are needed to organize, protect, ship, display at retail and store disc media sold and/or shipped in combination with ancillary materials.

A need also exists for devices which can effectively and efficiently organize, protect, ship, display at retail and store disc shaped media with other materials.

An opportunity exists that is not being commercially exploited at the present time to distribute disc-shaped recording media with materials that are either ancillary or wholly unrelated to the content of the disc media. This opportunity is not being exploited due to the lack of an effective container design and method for efficiently organizing, protecting, shipping, displaying at retail and storing disc-shaped media packaged with other materials.

SUMMARY OF THE INVENTION

One important object of this invention is to provide a container in which and a method whereby disc-shaped media and ancillary materials can initially be packaged together in stacked relationship and, after removal and use, they can easily be re-stored in stacked relationship in a manner so as to avoid contact there between.

Another object of this invention is to provide a container and a method of packaging that eliminates the need for a separate case (i.e., the need for a "jewel box") for the disc media.

Another object of this invention is to provide a container and a method of packaging whereby during initial storage, shipping, retail presentation and re-packaging disc media is securely held against movement and protected.

Another important object of this invention is to provide a shipping container in which and a method of shipping whereby disc-shaped media and other materials can be packaged, presented, conveyed, distributed and stored.

Another important object of this invention is to provide an aesthetically unique and compelling device and method for presenting at retail disc-shaped media and other materials which may or may not be related to the content of the media.

Another object of this invention is to provide a container and a method of packaging whereby the internal wall of the first chamber of the container is cylindrical in shape and of a diameter slightly larger than the external diameter of the disc media to thus retain the disc media in the container against movement in the plane of the disc media.

Another object of this invention is to provide a container and a method of packaging whereby either an annular ring or protrusions mounted on the internal wall of the first chamber define an opening slightly larger in internal diameter than the external diameter of the disc media into which the disc media can be inserted to thus retain the disc media in the container against movement in the plane of the disc media.

Another object of this invention is to provide a container and a method of packaging whereby either an annular lip or protrusions extend from the internal wall of the first chamber of the container and define an opening slightly smaller in internal diameter than the external diameter of the disc media on which the disc media can seat to thus retain the disc media in the container against movement in a first direction perpendicular to the plane of the disc media.

Another object of this invention is to provide a container and a method of packaging whereby the container has a removal lid that attaches to the container when the disc media is either initially positioned or subsequently re-stored on the seat and that retains the disc media against movement in a second, opposite direction perpendicular to the plane of the disc media.

Another object with this invention is to provide a container and a method packaging whereby the seat and lid are removable and the seat and lid can be combined to create a permanent storage and restoring package for the disc media alone.

Another object of this invention is to provide a container and a method of packaging whereby an annular ring or protrusions mounted on the internal wall of the first chamber define an annular post slightly smaller in exterior diameter than the diameter of the center hole of the disc media to thus retain the disc media on the post in the container against movement in the plane of the disc media.

Another object of this invention is to provide a container and a method of packaging whereby a protective insert is placed in the container before the disc media to protect the disc media from contact with the other materials.

Another object of this invention is to provide a container and a method of packaging whereby a replaceable protective insert is placed in the container before the disc media to protect the disc media from contact with the other materials, which insert can be removed to access the ancillary materials and can be replaced after the ancillary materials are re-stored in the container and before the disc media is re-stored in the container.

Another object of this invention is to provide a container and method of packaging whereby the disc media support members are removable so as to afford complete and unfettered access to the second chamber beneath the disc media.

Another object of this invention is to provide a container and method of packaging whereby the first chamber is within the removable lid.

Another object of this invention is to provide a container and method of packaging whereby the first chamber is within the removable lid and the disc media support member is a center post fixedly attached to and extending from the inside center of the lid.

Another object of this invention is to provide a container and method of packaging whereby the removable lid has both a first chamber for the disc media and a second chamber for other materials and wherein there is a third chamber in the container.

A further object of this invention is to provide a container and method of packaging whereby the container has first and second chambers and the second chamber in which the other materials are stored has a second opening besides the opening through the first chamber.

A further object of this invention is to provide container and a method of packaging whereby the container has a closure mechanism for the second opening that is separate and distinct from the closure mechanism for the opening into the second chamber through the first chamber.

A further object of this invention is to provide a container and method of packaging whereby the container has an exterior shape for the first chamber such that the first chamber can serve as a base for the container.

Yet another important object of this invention is to provide a container and method of packaging whereby the container has an exterior shape for the second chamber such that the second chamber can serve as a base for the container.

A still further object of this invention is to provide a container and method of packaging for disc shaped media and other materials whereby the top and bottom covers are detachable and can be combined to create a smaller container for the disc shaped media.

To accomplish these and other objects, the container of this invention in its preferred form is a cylinder provided with a removable lid and first and second chambers. The first chamber is immediately beneath the lid and has an inner structure defining circumferential support for disc media. The inner structure is a one-piece annular collar member, with an upstanding annular ring with an interior wall having a diameter slightly larger than the outside diameter of the disc media, and an annular lip that defines an annular opening having a diameter slightly smaller than the outside diameter of the disc media, such that the disc media sits on the annular lip and is restrained against movement in the plane of the disc media by the ring and against movement in directions perpendicular to the plane of the disc media by the lip and the lid. The inner structure further includes an annular clip that extends over the rim of the container wall in nesting configuration, and which is locked on the container wall when the lid is affixed to the container, but which can be removed after the lid and disc media are removed to facilitate unencumbered access to the second chamber of the container beneath the first chamber. The second chamber is the same diameter as the first chamber and is of sufficient height to accommodate other materials that may or may not have relevance to the disc media. The bottom of the second chamber remote from the lid is flat and serves as the base of the container.

In the preferred method of packaging, other materials are inserted into a first portion of an open ended cylindrical container through the open end, inner support elements are then inserted into the container through the open end, a protective element is then inserted into the container through the open end, disc media is then inserted into the container through the open end into a second portion of the container in protected engaging relation with the inner support elements within the container, and a lid is then applied to the container to both secure the disc media within the second portion of the container and to seal the container.

The above, as well as additional objects, features and advantages of the invention will become apparent in the following detailed description.

BRIEF DESCRIPTION OF THE DRAWINGS

The novel features believed characteristics of the invention are set forth in the appended claims. The invention itself, however, as well as the preferred mode of use, further objects and advantages thereof, will best be understood by reference to the following detailed description of an illustrative embodiment when read in conjunction with the accompanying drawings, wherein:

FIG. 3 is a top plan view of the novel disc packaging device of the present invention illustrating the alternative use of abutments and protrusions affixed to the inside wall of the container;

FIG. 3A is a cut-away, cross-sectional side view of a portion of the device shown in FIG. 3, along line B—B, with a disc media and other materials inserted and the lid affixed;

FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3;

FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3;

FIGS. 6A and 6B are cross-sectional views of alternate embodiments of the packaging device of the present invention depicting two different methods of mounting the disc media support member to the device outer wall;

FIG. 7 is a cut-away, cross-sectional side view of an alternative embodiment of the present invention with disc media and other materials inserted, the protective element inserted and the lid closed, in which the first chamber in which the disc media is stored is in the cover;

FIG. 7A is a cut-away, cross-sectional side view of an alternative embodiment of the device shown in FIG. 7, wherein the disc media is inserted into a protective envelope that is affixed to the inner surface of the cover;

DETAILED DESCRIPTION OF THE INVENTION

Figure 1:
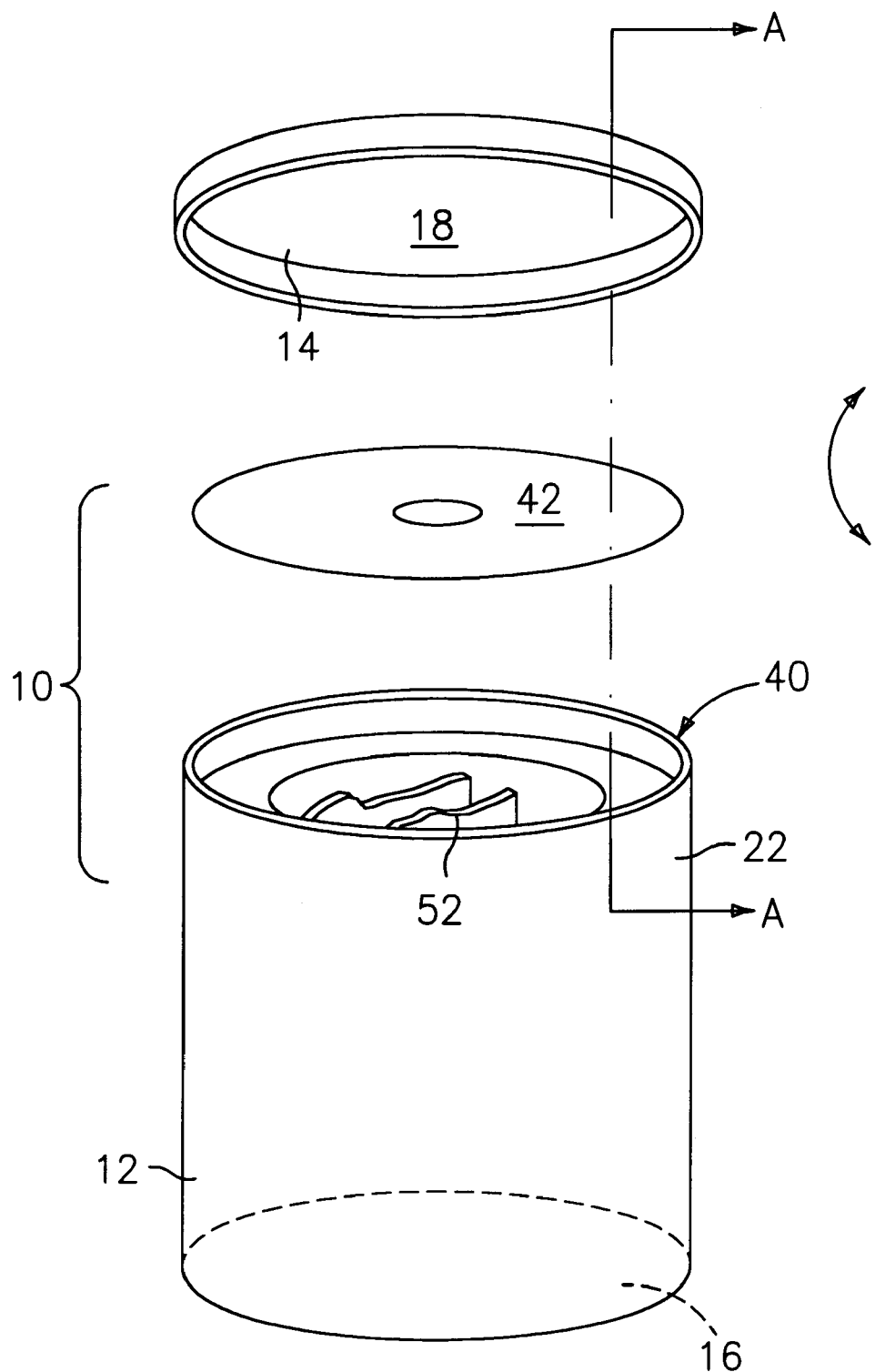
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

Figure 2:
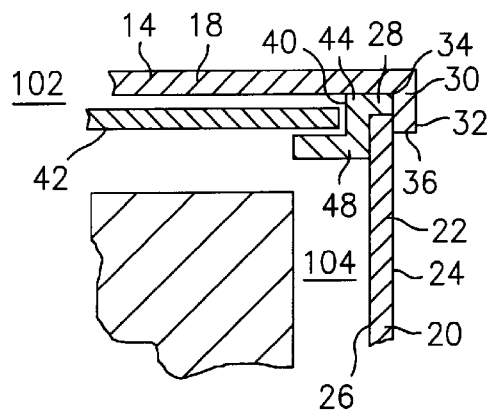
FIG. 2 is a cut-away, cross-sectional side view of a portion of the novel disc packaging device of FIG. 1 when the lid is on the container, along line AA, illustrating the resultant first and second chambers thereof.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

Figure 2A:
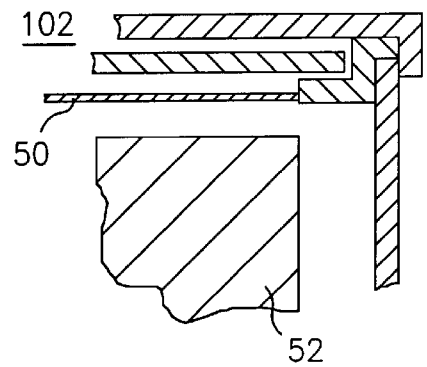
FIG. 2A is an alternative embodiment of the device shown in FIG. 2, wherein a protective element is inserted between the first and second chambers.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

Figure 2B:
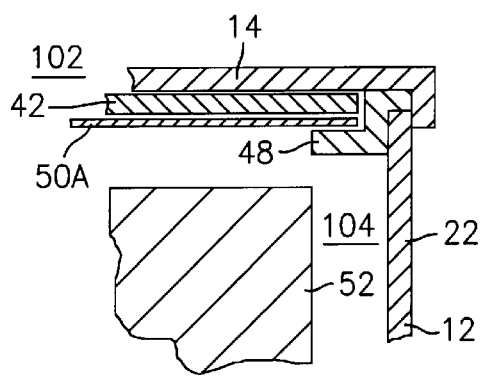
FIG. 2B is an alternative embodiment of the device shown in FIG. 2A, showing an alternative method of insertion of the protective element between the first and second chambers.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

Figure 2C:
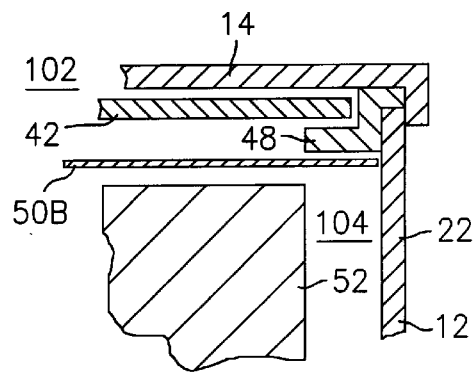
FIG. 2C is a further alternative embodiment of the device shown in FIG. 2A, showing a further alternative method of insertion of the protective element between the first and second chambers.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

In the alternative embodiment shown in FIGS. 3 and 3A, the inner structure 40 is modified. The annular collar 44 with annular ring 46 and annular lip 48 is replaced by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

Figure 4:
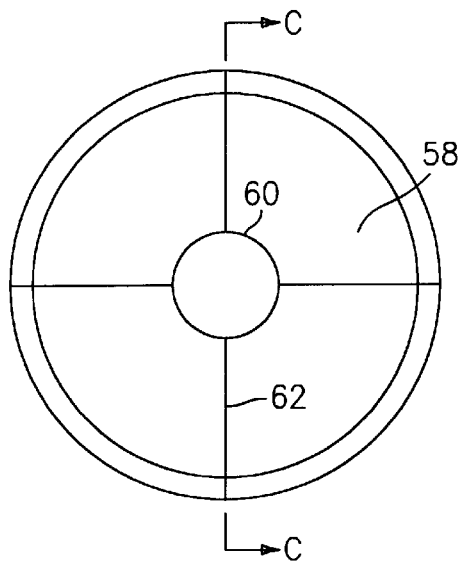
FIG. 4 is a top plan view of the novel disc packaging device of the present invention illustrating the alternative use of a center annular post support for the disc media suspended from spokes.
Figure 4A:
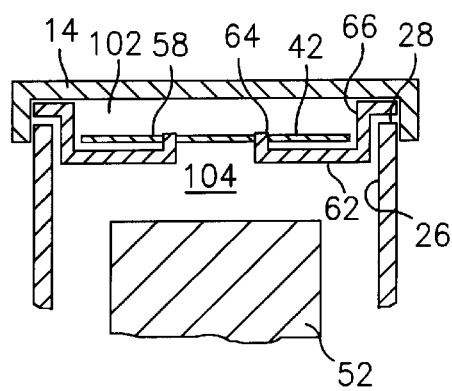
FIG. 4A is a cut-away, cross-sectional side view of the device shown in FIG. 4, along line C—C, with a disc media and other materials inserted and the lid affixed.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits. The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fingers 56 (ala the webbing in a duck's foot) comprised of a thin material to provide protection for the disc shaped media 42 from the other materials 52. Inside the annular ring 60 would be left open to allow the consumer, after removing the cover 14, to insert their finger into the annular ring and to thereby remove both the disc shaped media 42 and the structure 58.

Figure 5:
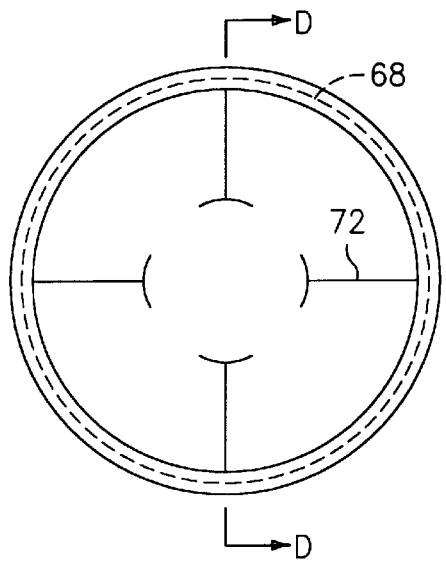
FIG. 5 is a top plan view of the novel disc packaging device of the present invention illustrating fingers that extend from a frame carried by the side wall of the container and that provide center support for the disc media.
Figure 5A:
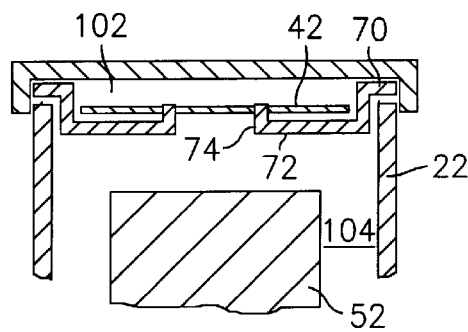
FIG. 5A is a cut-away, cross-sectional side view of the device shown in FIG. 5, along line D—D, with a disc media and other materials inserted and the lid affixed.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

As seen in FIGS. 6A and 6B, the fingers 72 in the embodiment shown in FIGS. 5 and 5A do not necessarily need to be suspended from an annular collar. Alternatively, they could be clipped to the side wall 20 as seen in FIG. 6A or they could be screwed into the side wall 20 as shown in FIG. 6B.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety of conventional ways, e.g., snap on, telescope on, screw on, etc.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) all of which can then be inserted into the envelope and then removed from the envelope once the envelope is opened.

Figure 8:
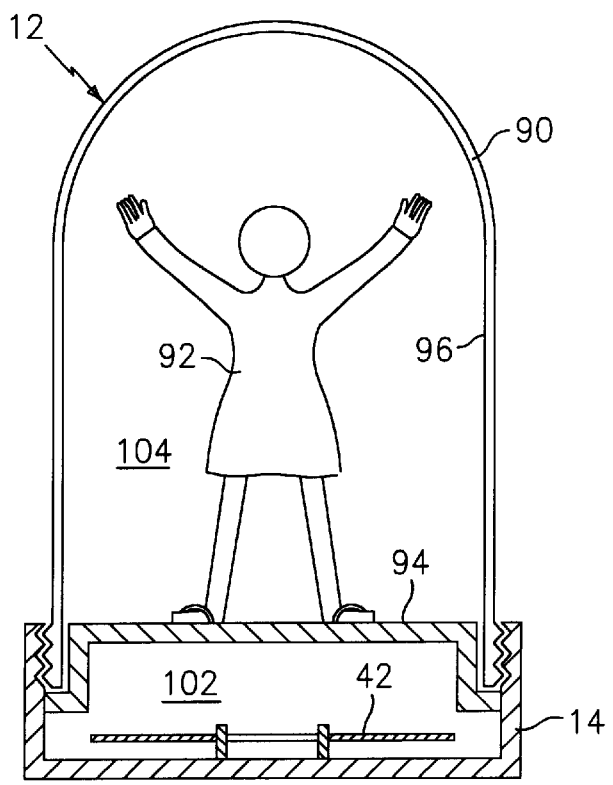
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
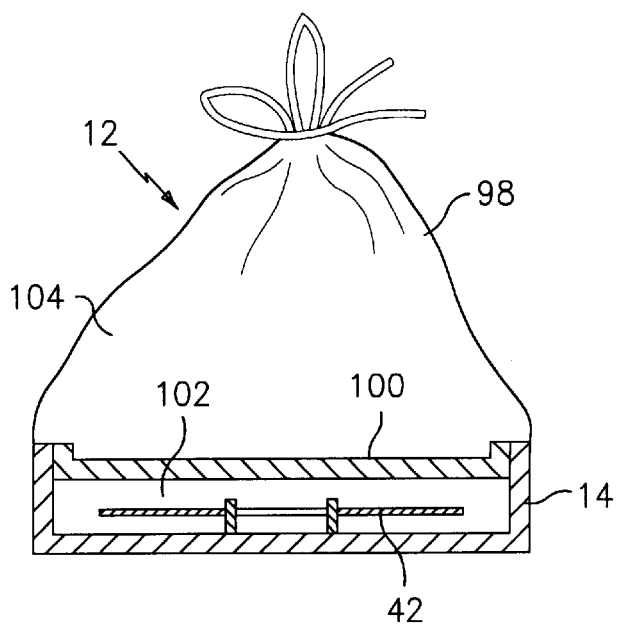

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally engages the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
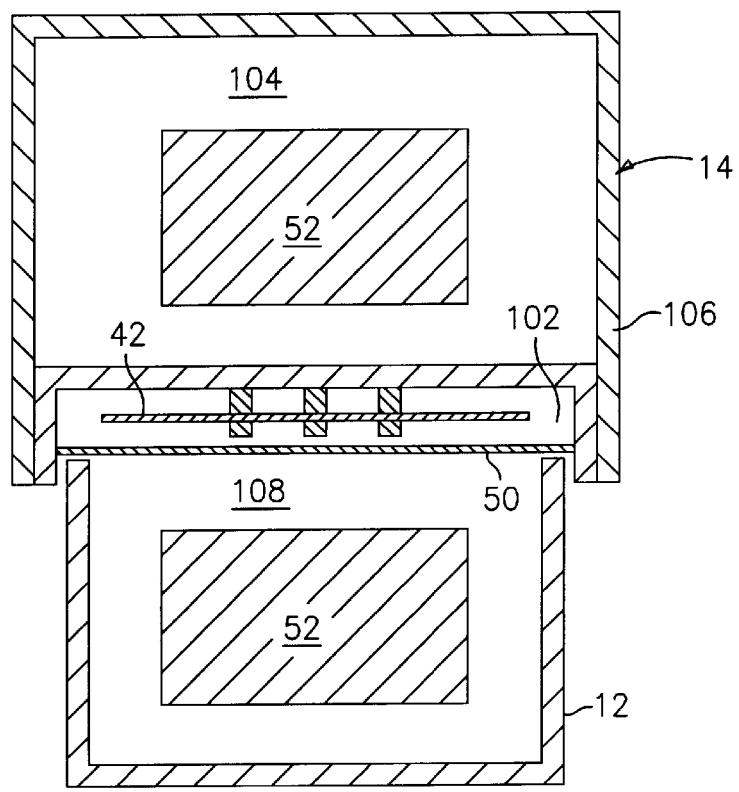
FIG. 9 is a cut-away, cross-sectional side view of an alternative embodiment of the present invention in which the disk media is located in the lid and the lid and the container include second and third chambers, respectively, for storing other material.
Figure 10:
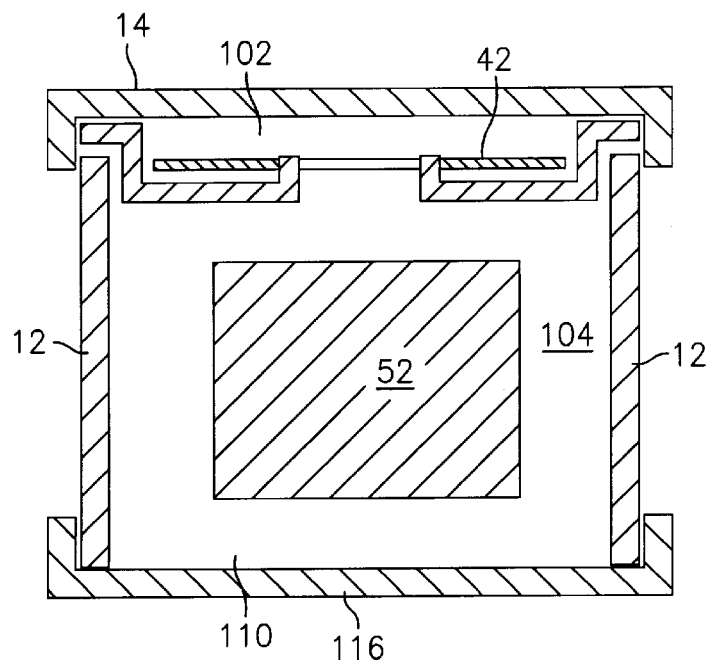
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown in FIG. 9, the disc shaped media is stored in a first chamber 102 in the lid 14 defined by an annular support 40 similar in construction to the embodiment of FIG.7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
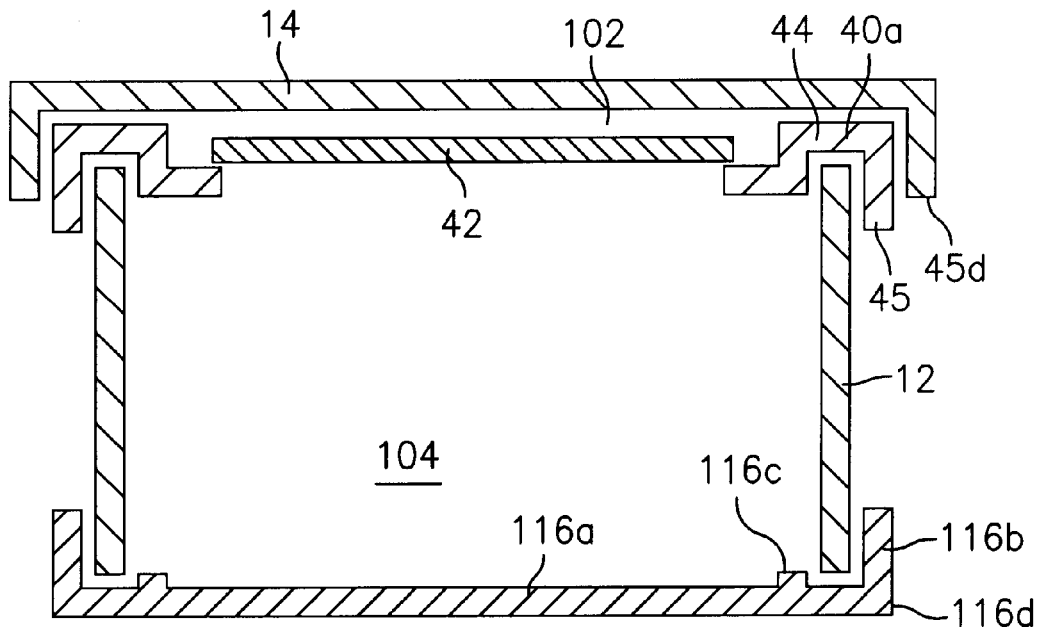
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
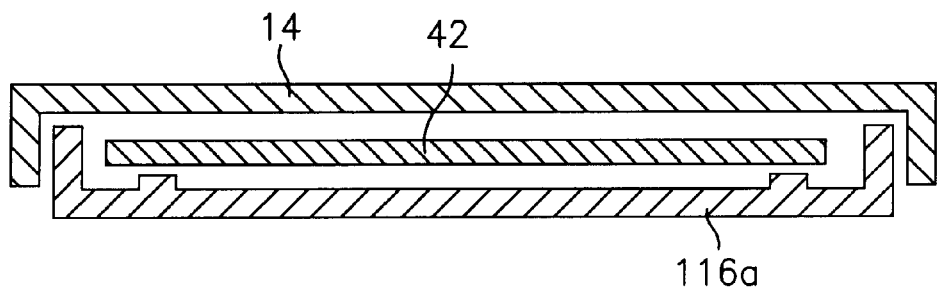

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
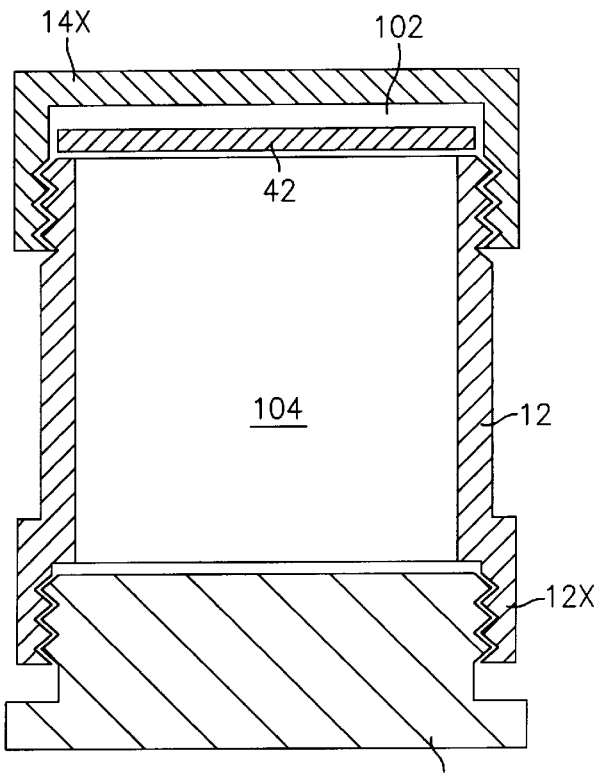
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
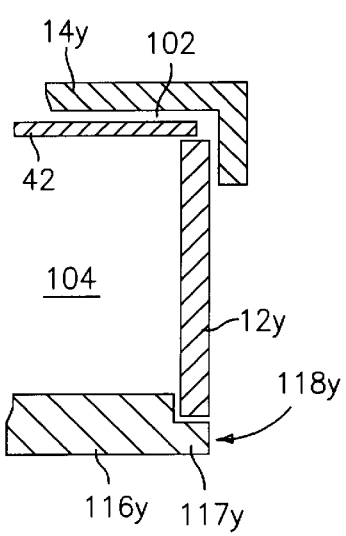
FIGS. 12A and 12B are cut-away, cross-sectional side views of alternative embodiments of the device shown in FIG. 12, wherein the two covers slidably engage after removal (FIG. 12A) or threadably engage after removal (FIG. 12B).
Figure 12B:
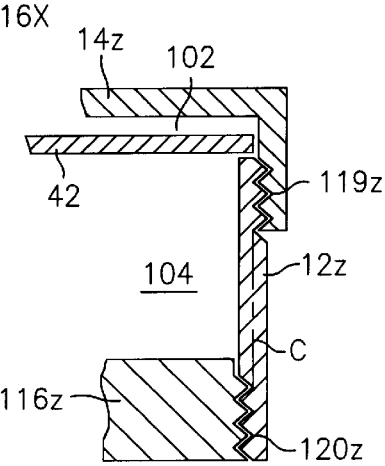

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 116z are removed, they can be threadably engaged to form a mini-storage unit for the disc media.

Figure 13:
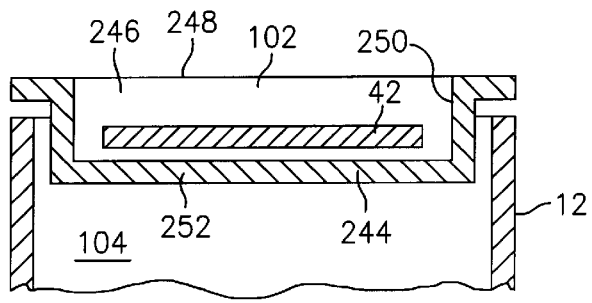
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

Figure 14:
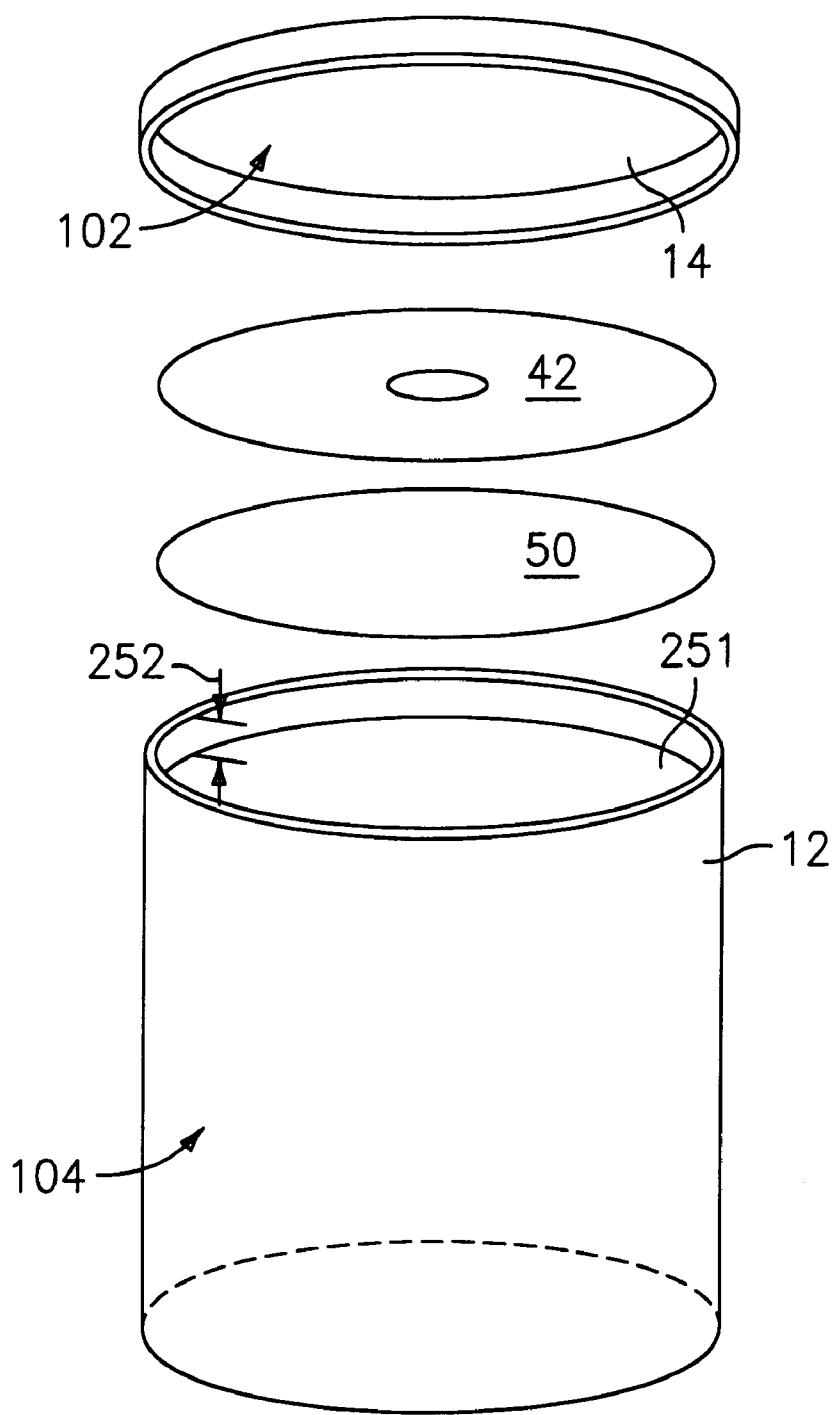
FIG. 14 is an exploded perspective view of a further alternative embodiment of the novel disc packaging device of the present invention with the lid, disk media and protective element removed, illustrating the use of a sealed base.

FIG. 14 shows a further alternative embodiment wherein the base 12 is a separately manufactured container of miscellaneous content, that includes a slightly concave end 251, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

Figure 15:
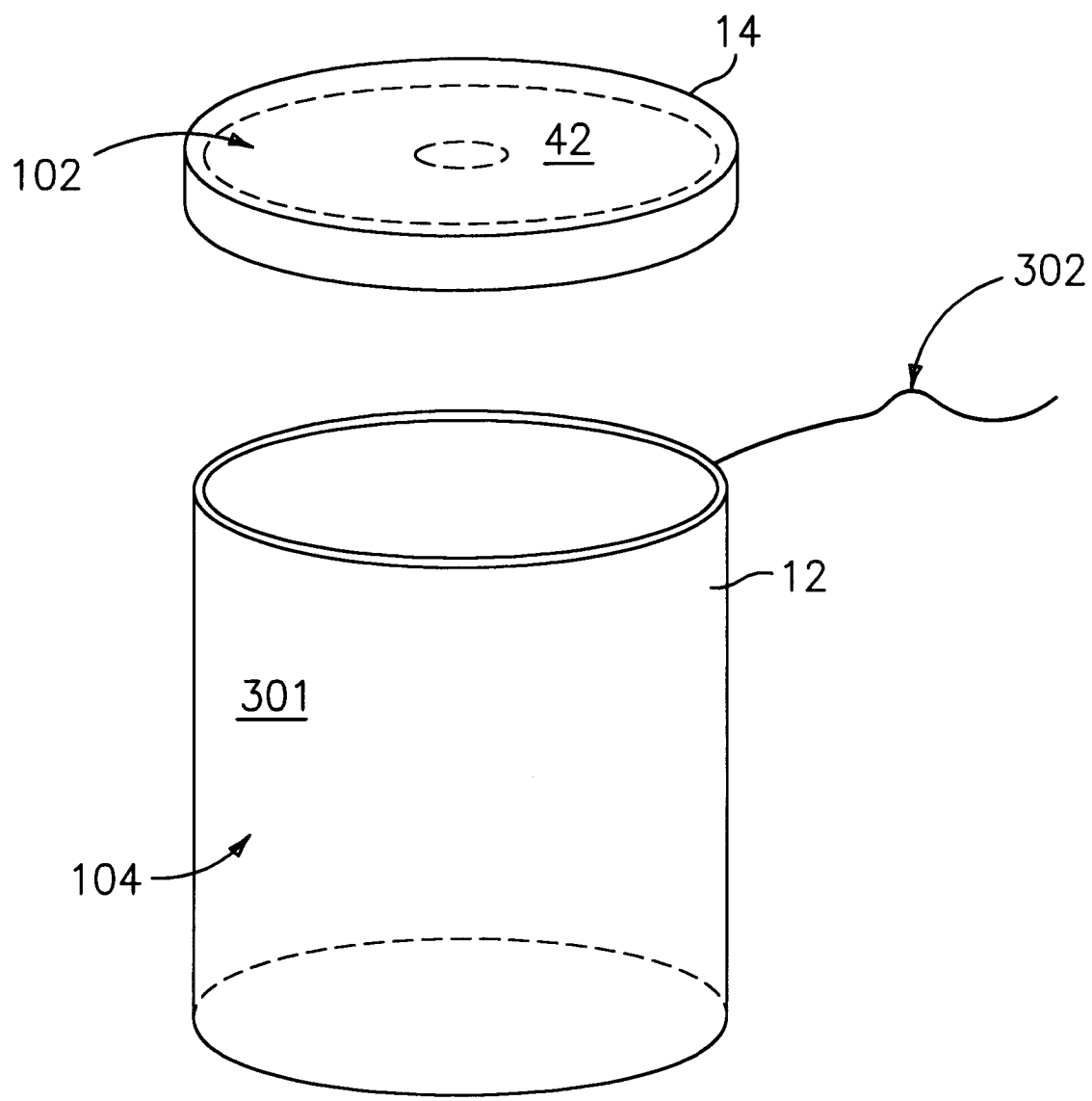
FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.

FIG. 15 shows a further alternative embodiment wherein the disc shaped media is mounted and sealed within cover 14, e.g., as taught herein in connection with other embodiments, and cover 14 is attached to base 12 by paper packaging material skin 301 that binds the cover 14 and base 12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the art having reviewed this disclosure. The abutment/protrusions clips of FIG. 3 could be mounted on a non-cylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/protrusion clips of FIG. 2, the spider structure of FIG. 3 and the trap structure of FIG. 4 have been shown, those skilled in the art after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

What is claimed is:

1. An elongated packaging device, said packaging device including:
    at least one removable internal upper chamber having an upper opening therein for receiving at least one disc-shaped media having an aperture therethrough, said upper chamber having an external surface and an internal surface, and further including a structure extending from said internal surface, wherein said structure is adapted to be inserted through said aperture so as to support and positively receive and retain said disc-shaped media;
    at least one internal lower chamber, said lower chamber having a lower opening therein for receiving materials other than said disc-shaped media and being adapted to positively receive and retain said materials, said upper chamber being removably attached to said lower chamber; and
    a protective element adapted to be nested within said upper opening of said upper chamber, said protective element being located above said lower opening of said lower chamber.

2. The packaging device of claim 1, further including releasable closure means for releasably securing the opening at the one end of said device.

3. The packaging device of claim 1, wherein said means for supporting and protecting is removable.

4. The packaging element of claim 1, wherein said disc-shaped component is a recording media disc.

5. The packaging device of claim 1, wherein said lower chamber is adapted to positively receive and retain materials relating to said disc-shaped item.

6. The packaging device of claim 1, wherein said support element includes means for releasably retaining and supporting said disc-shaped item in both a horizontal and vertical direction.

7. A packaging device for packaging at least one disc-shaped media and other materials comprising:
    a container including a first opening and a first internal chamber for receiving and retaining materials other than a disc-shaped media;
    a lid including a second opening and a second internal chamber for receiving and retaining a disc-shaped media having an aperture therethrough, wherein said lid is adapted to be removably attached to said container about said first opening of said container to simultaneously cover said first opening of said container and said second opening of said lid, and wherein said lid has an external surface and an internal surface;
    means for supporting and protecting said at least one disc-shaped media within said lid, wherein said means for supporting comprises a structure extending from said internal surface of said lid wherein said structure is adapted to be inserted through said aperture in said media so as to support and positively receive and retain said disc-shaped media; and
    a protective element adapted to be nested within said second opening of said lid, said protective element being located above said first opening of said container.

8. The device of claim 7, wherein said structure comprises an annular post mounted on and extending from said internal surface of said lid adapted to be inserted and engaged within said aperture.

9. The device of claim 7, wherein said structure comprises at least two upstanding surface projections mounted on and extending from said internal surface of said lid adapted to be inserted and engaged within said aperture.

10. The device of claim 7, wherein said container further includes a rim defining the perimeter of said first opening, and wherein said lid further includes a skirt member adapted to engage said rim.

11. The device of claim 10, further including a removable collar adapted to secure said lid to said container by capturing said rim and said skirt member.

12. The device of claim 10, wherein said skirt member includes a downwardly extending flange and said lid is removably attached to said container by means of a compression fit between said rim and said flange.

13. The device of claim 10, wherein said container further includes a rim defining the perimeter of said first opening, and wherein said lid further includes a skirt member adapted to engage said rim, said skirt member having a downwardly extending flange member adapted to overlap said rim, said device further including a removable collar wherein said lid is secured to said container by means of said removable collar.

14. The device of claim 7, further including first sealing means for sealing said disc-shaped media in said second internal chamber before attachment of said lid to said container.

15. The device of claim 7, further including second sealing means for sealing said other materials in said first internal chamber of said container before attachment of said lid to said container.

16. The device of claim 7, further including first sealing means for sealing said disc-shaped media in said second internal chamber, and second sealing means for sealing said other materials in said first internal chamber before attachment of said lid to said container.

17. The device of claim 7, wherein said lid further includes a third internal chamber.

18. The device of claim 7, further including a second lid defining a third internal chamber.

19. A packaging device for packaging at least one disc-shaped media and other materials comprising:
  a container including a first opening and a first internal chamber for receiving and retaining materials other than a disc-shaped media;
  a lid including a second opening and a second internal chamber for receiving and retaining a disc-shaped media having an aperture therethrough, wherein said lid is adapted to be removably attached to said container about said first opening of said container to simultaneously cover said first opening of said container and said second opening of said lid, and wherein said lid has an external surface and an internal surface;
  means for supporting and protecting said at least one disc-shaped media within said lid, wherein said means for supporting and protecting comprises a cylindrical post extending from said internal surface of said lid wherein said post is adapted to be inserted through said aperture in said media so as to support and positively receive and retain said disc-shaped media,
  a protective element a ted to be nested within said second opening of said lid, said protective element being located above said first opening of said container; and
  said container further including a rim defining the perimeter of said first opening and said lid further including a skirt member adapted to engage said rim.

20. The device of claim 19, further including a removable collar adapted to secure said lid to said container by capturing said rim and said skirt member.

21. The device of claim 19, wherein said skirt member includes a downwardly extending flange and said lid is removably attached to said container by means of a compression fit between said rim and said flange.

22. A packaging device for packaging at least one disc-shaped media and other materials comprising:
  a container including a first opening and a first internal chamber for receiving and retaining materials other than a disc-shaped media;
  a lid including a second opening and a second internal chamber for receiving and retaining a disc-shaped media having an aperture therethrough, wherein said lid is adapted to be removably attached to said container about said first opening of said container to simultaneously cover said first opening of said container and said second opening of said lid, and wherein said lid has an external surface and an internal surface;
  said lid further including an interior surface and at least two upstanding surface projections mounted on and extending from said interior surface, wherein said at least two upstanding surface projections are adapted to be inserted and engaged within said aperture so as to support and positively receive and retain said disc-shaped media;
  a protective element adapted to be nested within said second opening of said lid, said protective element being located above said first opening of said container; and
  said container further including a rim defining the perimeter of said first opening and said lid further including a skirt member adapted to engage said rim.

23. The device of claim 22, further including a removable collar adapted to secure said lid to said container by capturing said rim and said skirt member.

24. The device of claim 22, wherein said skirt member includes a downwardly extending flange and said lid is removably attached to said container by means of a compression fit between said rim and said flange.

25. A method for packaging a disc-shaped media together with other material, said method comprising the steps of:
  providing a disc-shaped media having an aperture therethrough;
  providing materials other than a disc-shaped media;
  providing an elongated packaging device comprising:
    a container including a first opening and a first internal chamber for receiving and retaining said other materials;
    a lid including a second opening and a second internal chamber for receiving and retaining said disc-shaped media, wherein said lid is adapted to be removably attached to said container about said first opening of said container to simultaneously cover said first opening of said container and said second opening of said lid, and wherein said lid has an external surface and an internal surface;
    means for supporting and protecting said at least one disc-shaped media within said lid, wherein said means for supporting comprises a structure extending from said internal surface of said lid wherein said structure is adapted to be inserted through said aperture in said media so as to support and positively receive and retain said disc-shaped media; and
    a protective element adapted to be nested within said second opening of said lid, said protective element being located above said first opening of said container
  inserting said other material into said first internal chamber through said first opening;
  inserting said disc-shaped media into said second internal chamber through said second opening;
  positively retaining said disc-shaped media by means of inserting said structure through said aperture;
  nesting said protective element within said second opening; and
  attaching said lid to said container.

26. The method of claim 25, further including the step of sealing said other material in said first internal chamber after insertion.

27. The method of claim 25, wherein said lid includes a skirt and said container includes a rim defining the perimeter of said first opening, further including the step of engaging said skirt to said rim.

28. The method of claim 27, further including the step of securing said lid to said container by capturing said rim and said skirt member using a removable collar.

29. The method of claim 27, further including the step of removably attaching said lid to said container by means of a compression fit between said rim and said skirt member.

* * * * *